(12) United States Patent
Khan et al.

(10) Patent No.: US 7,225,338 B2
(45) Date of Patent: May 29, 2007

(54) SECURE SYSTEM FOR THE IDENTIFICATION OF PERSONS USING REMOTE SEARCHING OF FACIAL, IRIS AND VOICE BIOMETRIC TEMPLATES

(76) Inventors: Sal Khan, 6546 Princiotta, Greely, Ontario (CA); Martin D. Levine, 19 Church Avenue, Westmount, Quebec (CA)

( * ) Notice: Subject to any disclaimer, the term of this patent is extended or adjusted under 35 U.S.C. 154(b) by 742 days.

(21) Appl. No.: 10/178,044

(22) Filed: Jun. 21, 2002
(Under 37 CFR 1.47)

(65) Prior Publication Data
US 2003/0126121 A1    Jul. 3, 2003

Related U.S. Application Data

(60) Provisional application No. 60/299,429, filed on Jun. 21, 2001.

(51) Int. Cl.
    *G06K 9/46* (2006.01)
(52) U.S. Cl. .......................................... 713/186; 726/2
(58) Field of Classification Search ............... 713/186; 707/102; 726/2
See application file for complete search history.

(56) References Cited

U.S. PATENT DOCUMENTS 5,465,303 A * 11/1995 Levison et al. ............. 382/124
6,018,739 A * 1/2000 McCoy et al. .............. 707/102
6,035,055 A * 3/2000 Wang et al. ................ 382/118

OTHER PUBLICATIONS

Savetz, Kevin, "Private Data Across The Internet", Web Developer, Jul./Aug. 1996 Issue, pp. 1-6, obtained from http://webdeveloper.com/security/security_virtual_private_networks.html.*

* cited by examiner

*Primary Examiner*—Emmanuel L. Moise
*Assistant Examiner*—Jeffrey Popham
(74) *Attorney, Agent, or Firm*—J. Gorden Thomson

(57) ABSTRACT

A system and method that permits a plurality of clients to remotely search and share biometric information contained in single or a plurality of databases over a local area network, wide area network or public network such as the Internet. The system comprises one ore more remote workstations each having a camera and means for converting facial images of persons of interest to biometric templates. A biometric search query may be placed from the remote workstation to one or more searchable databases containing a plurality of biometric templates. The databases are connected to the workstation by communication means through a server that manages data traffic between the remote workstation and the database. A search engine compares the biometric template of the person of interest to those stored on the database(s) and indicates a match according to a predetermined confidence interval. A predetermined number of matches are prioritized in order of similarity to the person of interest and returned to the workstation for review.

9 Claims, 13 Drawing Sheets

SECURE SYSTEM FOR THE IDENTIFICATION OF PERSONS USING REMOTE SEARCHING OF FACIAL, IRIS AND VOICE BIOMETRIC TEMPLATES

CROSS REFERENCE TO RELATED APPLICATIONS

This application is entitled to the benefit of U.S. Provisional Patent Application Ser. No. 60/299,429 filed in the United States Patent and Trademark Office on Jun. 21, 2001, which is hereby incorporated herein by reference in its entirety for all purposes.

FIELD OF THE INVENTION

The present invention relates to a system and method for remotely searching biometric data. More specifically the present invention is concerned with a system and method that permits a plurality of clients to search and share biometric information contained in single or a plurality of databases over a local area network, wide area network or public network such as the Internet.

BACKGROUND OF THE INVENTION

Many organizations rely upon the sharing of information to authenticate the identity of individuals for a variety of reasons. For example, in fighting crime and apprehending criminals, police departments depend on being able to share information from the records systems of other police departments. This is because criminals are transient. Different police departments may be tracking the same criminal and not be aware of their mutual interest in that individual. Furthermore, police departments require swift access to information that will give them probable and reasonable grounds to detain a criminal suspect. Typically, this requires the individual police officer to manually search records or place numerous telephone calls to individuals who may not be available when the information is required. Therefore, data sharing between organizations like police departments can combat crime and save investigative hours. Unfortunately, it is only the minority of police departments in any jurisdiction that are sufficiently large and well funded and can afford a searchable records management system. Most police departments cannot afford such extravagant systems. This makes it difficult for smaller police departments to share critical information between themselves and with the larger police departments.

Modern police records generally contain information about people in the form of names, addresses, vehicle license plate numbers, textual histories and records of prior criminal activities. Increasingly, biometrics is becoming a useful tool in fighting crime. These biometrics have traditionally taken the form of images of fingerprints and systems for comparing them against an input. Modern computers with significant processing power can now store and manipulate much larger image files. Police departments can now create databases of mugshots of criminals that can be accessed by individual officers and used to identify suspects. However, one disadvantage associated with a large system of mug shots is that comparisons must be done visually, that is, using the human eye. This can be a time consuming, cumbersome and inaccurate process.

Other organizations also need a capability to verify the identity of their clients. For example passport control agencies and licensing bodies are vulnerable to fraudulent use of identification documents.

Advancements in computer technology have created an opportunity to apply machine vision and computerized face recognition technologies to applications where it is important to confirm the identity of individuals. Furthermore, the Internet provides an opportunity for small organizations to access, search and share centralized databases created and held by larger organizations. This opportunity has not been fully exploited because of the expense involved in acquiring a system that would permit such activities.

The creation of a registry of biometric information and the ability to share such information in a swift and inexpensive manner over the Internet offers a number of advantages such as perpetual operation and access from remote locations. Therefore there is a requirement for an Internet-based, low cost and low maintenance tool that will create and permit remote access to centralized registries of biometric records for the purpose of biometric data exchange over a local or wide area network. To the best of our knowledge, no such system or method has been created.

OBJECTS OF THE INVENTION

It is an object of the present invention to overcome the problems listed above.

A further object of the present invention is to provide a system and method for searching biometric data over a network.

Another objective of the present invention is to provide a system and method that uses the Internet as a communication infrastructure to enable time and cost-effective information sharing of biometric information between organizations while avoiding the problems that have undermined past attempts to share such information among records management systems of various organizations.

SUMMARY OF THE INVENTION

One inventive aspect of this invention is the marriage of secure distributed searching methodologies over an electronic communication network and normalized face recognition results metrics. For example, if a police agency (requesting node) identified a person of interest, such as a criminal suspect, and wanted to obtain the closest one hundred known criminal facial images matching the biometric face template of the person of interest or a set of face templates the police agency may wish to query, say, 200 existing facial biometric template databases of other police agencies (identification node) in other cities. The requesting node would send its request with the face biometric template of the person of interest to each of the 200 identification nodes. Each identification node would search its database and return their top one hundred matching biometric templates to the requesting node. The requesting node would then be faced with running an additional search of 20,000 received templates to obtain the 100 top matches to the template of the person of interest. This results in great inefficiency as only the closest 100 images are relevant and displayed. The other 19,900 are irrelevant and discarded. The two problems associated with this methodology are (1) the time required to download all the biometric templates received from a plurality of identification nodes is directly proportional to the number of participating identification nodes; and, (2) the requesting node needs the computer computational capability to have the face recognition search engine to rerun the search over a very large sample of possible matches.

In the present invention this methodology is greatly improved by having the requesting node send the initial query and target biometric template to each participating identification node with normalized search conditions such as requested speed of the search and required search accuracy. Hence, each participating identification node conducts its search based on the normalized search results metrics demanded by the requesting node and obtains a much smaller set of normalized potential matches. Each of the potential matches at each of the identification nodes is given a "distance" or degree of similarity to the target facial template before it is returned to the requesting node. The requesting node then combines all the results from the identification nodes and selects the 100 closest matching images based on the "distance" to the target image. Therefore, other innovative aspects of the present invention are that it reduces the amount of download time required by the requesting node to obtain and determine the top matches since only the most relevant images are retrieved from the identification nodes; and, there is no need on the part of the requesting node to run a comparison scan with thousands of images. This means that the requesting nodes need only have sufficient computation power to note the "distances" to the target image.

A further innovative aspect of the present invention is that it permits the creation of a secure distributed face recognition network than can be used by a requesting node for a "one to many" search and a "one to one" suspect search. Secure searching is provided by distributed network authentication by submitting the target face biometric template to an appropriate authentication code which the identification nodes will either accept or reject.

According to the invention there is provided a system for searching biometric data that comprises a least one remote workstation for inputting a search query. The remote workstation may be located at the police department of a small town. The remote workstation is connected to a searchable database of biometric templates through a server. Communications between the workstation and the server and between the server and the database are done over the Internet.

Another aspect of the present invention is secured communications over a local or wide area network using encryption or a virtual private network.

According to another aspect of the present invention there may be one central searchable database or a plurality of searchable databases.

According to another aspect of the present invention the remote work station is provided with an image detector for obtaining images of individuals of interest; an image converter operatively coupled to the image detector for digitally encoding the images into biometric templates representative of the images; means for inputting a search query; and, means for receiving search query results. The image may obtain images of the face of the individual of interest or the iris of the individual of interest. The remote workstation may also obtain a voice print of the individual of interest.

According to yet another aspect of the present invention the searchable database comprises a plurality of searchable retrievable biometric templates representative of individuals; means for receiving a search query from a user for a specific biometric template; means for executing a search for a specific biometric template against those contained in the database; means for prioritizing potential matches according to their similarity; potential match notification means; and, means for transmitting search results falling within said predetermined confidence interval to the user.

According to an additional aspect of the present invention, the server is operatively connected between at least one workstation and at least one database. The server includes means for receiving a search query from a remote work station; means for transmitting the search query to at least one database; means for receiving potential matches falling within a predetermined similarity measure from at least one database; means for prioritizing potential matches received from a plurality of databases in accordance with a similarity measure; means for transmitting search results falling within the similarity measure to the work station.

In still another aspect of the present invention, the server is connected to one central database and transmits a search query from one or more workstations to the central database.

In a further embodiment of the present invention the server is connected to a plurality of databases and transmits a search query from one or more workstations to each of the plurality of databases.

Yet another aspect of the present invention is the creation of a searchable database of biometric templates obtained from live individuals. In one application of the present invention, there may be a need on the part of a central authority to register a group of individuals of interest. One example is the registration of driver's license holders and passport holders. In these examples the individuals are live and images of their faces can be obtained. Creating such a database involves obtaining a plurality of video images of the faces of each individual in a single or various positions. Several different head positions may be taken such as: full front; 45 degree left turn, 45 degree right turn; 45 degree tilt up; 45 degree tilt down; 45 degree tilt up left; 45 degree tilt down left; 45 degree tilt up right and 45 degree tilt up left. From each of these video images the desired facial features will be extracted according to the face recognition software used and codified into a digitized biometric template representative of the individual. These templates will then be transmitted to a remote storage medium.

Still another aspect of the present invention includes the creation of a biometric database using only the photographs of a group of individuals of interest. For example, large police departments have thousands of images of criminals and criminal suspects. These images may be held as photographs or they may have been digitized and stored on a database as in a format such as tif, jpeg or gif. To create a database of searchable biometric templates from these images each of the images is scanned and converted into a video image. Each of the video images is then processed by face recognition technology and the required facial features are extracted from each. Each image is then converted into a digital biometric template representing a single individual. The images are then transmitted to a remote storage medium. In some circumstances, the images will not be able to be scanned correctly the first time in order to create a usable biometric template. Therefore, another aspect of this invention includes a verification process whereby the user can visually scan each digital video image created by the face recognition software to ensure that the required facial features can be accurately extracted. An example of such a feature is the location of each eye.

In accordance with another aspect of the present invention there is provided a method whereby a remote workstation can access a biometric template database, input a search query based on a specific biometric template of an individual of interest and receive a list of possible matches falling within a predetermined interval of similarity. The method comprises the following steps: capture the image of the face of the individual of interest; convert the image into a biometric template; initiate a search query; transmit the biometric template to the server; the server transmits the search query and biometric template to all biometric databases connected to its network; each database will execute a search routine and identify a predetermined number of possible matches to the query using a predetermined interval of similarity; each database will transmit notification of matches to the server and transmit all possible biometric templates to the server; the server will receive all biometric templates from all of the databases and execute another search routine to identify a predetermined number of matches amongst all matches received from each database according a predetermined interval of similarity; the selection will be prioritized in a descending order of closeness to the query; the server will then notify the workstation of the matches and transmit all biometric templates identified by the server as a possible match to the workstation; the workstation will match each biometric template to a stored image of the individual, viewable by the user; the user will confirm the identity of the individual of interest.

In still another aspect of the present invention, the user at a remote workstation is permitted to store the biometric templates received from the server and create its own database of biometric images. This database will then be available for receiving search queries from the workstation.

In yet another aspect of the present invention, the user at a remote workstation is able to submit a biometric template to the server for storage on all connected databases. In this way the databases can be periodically enhanced by workstations.

In still another aspect of the present invention, it will be possible for individuals to receive training on the system over a communications network using their remote workstations.

The features and advantages in the specification are not all-inclusive and particularly many additional features and advantages will be apparent to one of ordinary skill in the art in view of the drawings, specifications and claims hereof. For example, the biometric may consist of a facial biometric or an iris biometric. The biometric may also be a voice pattern. Moreover, it should be noted that the language used in the specification has been principally selected for readability and instruction purposes and may not have been selected to delineate or circumscribe the inventive subject matter, resort to the claims being necessary to determine such inventive subject matter.

BRIEF DESCRIPTION OF DRAWINGS

The present invention will be further understood from the following description with references to the drawings in which.

DETAILED DESCRIPTION

Figure 1:
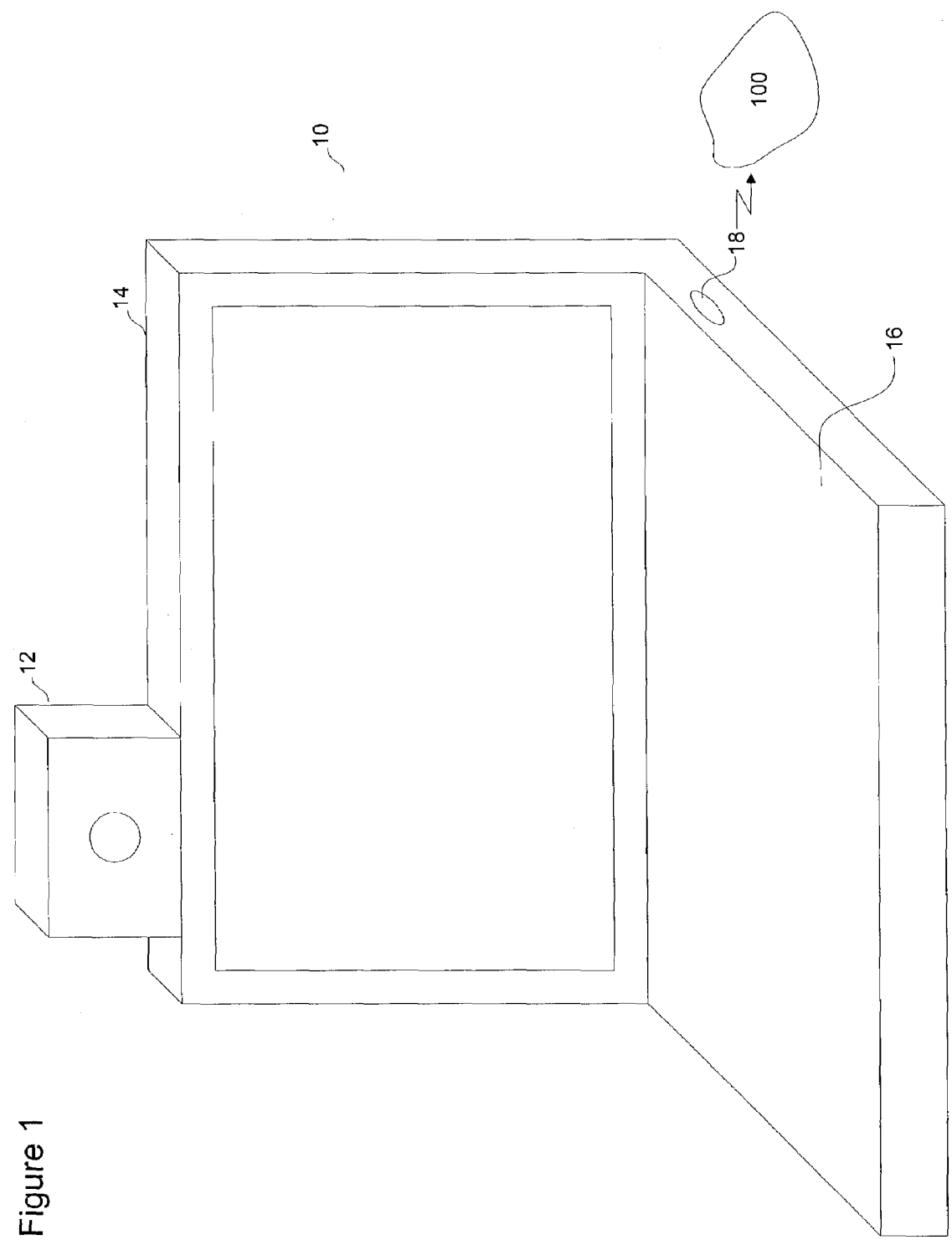
FIG. 1 shows a typical workstation associated the present invention.

Referring to FIG. 1 there is shown a workstation (10) in accordance with one embodiment of the present invention. The workstation comprises an imaging device (12) attached to note book computer (14). The imaging device may also be attached to a desktop computer or a personal computing device such as those sold by Palm™. The workstation may be located inside a building or it may be located on a mobile platform such a police car. The workstation (10) is connected to a communications network (100) through communications port (18). The client accesses the communications network through keyboard (16) and can submit search queries to a biometric database. Alternatively, instead of using keyboard entry, the user may use voice commands if the computer (14) is equipped to receive them. The imaging device is adapted to scan the face of an individual whose identity is unknown to obtain a set of facial metrics. In another embodiment of the invention the iris of the individual is scanned. In another embodiment of the invention a voice print is obtained.

Figure 2:
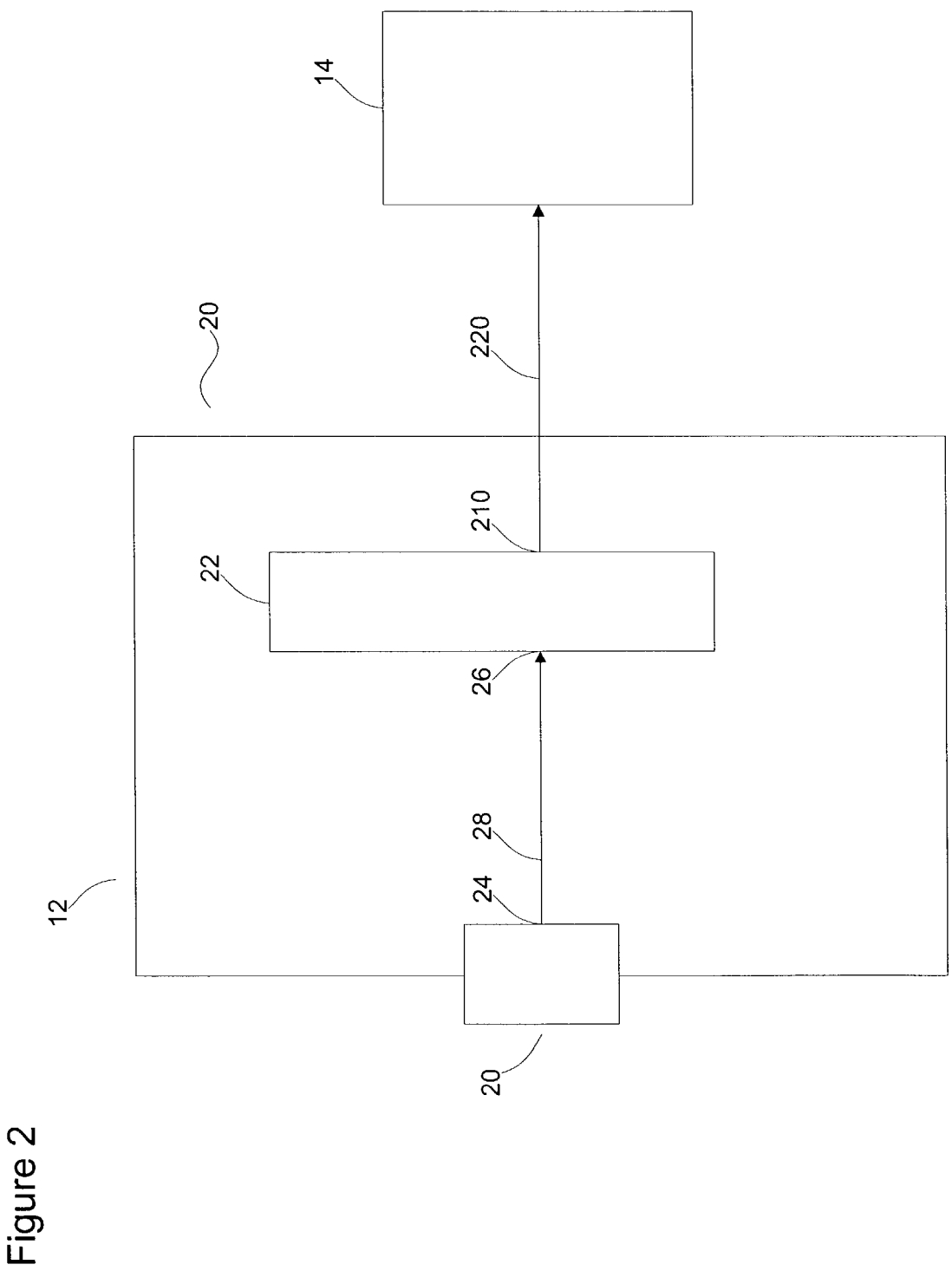
FIG. 2 shows a diagram of an imaging device of one embodiment of the present invention.

Referring to FIG. 2 there is shown a diagram of an imaging device (12) of one embodiment of the present invention. The imaging device comprises an image detector (20) having a YUV output (24). The imaging device also comprises a digital signal processor (DSP) (22) for converting the image from the image detector to a video signal. The image detector (20) is connected from YUV output (24) to input (26) of the DSP by way of bus (28). DSP (22) transmits a video signal to the computer (14) by way of output (210) and bus (220). Image detectors that can be used in this system are the MAPLESIGHT™ device and the FACE-CAM™ device by VisionSphere Technologies Inc.

Figure 3:
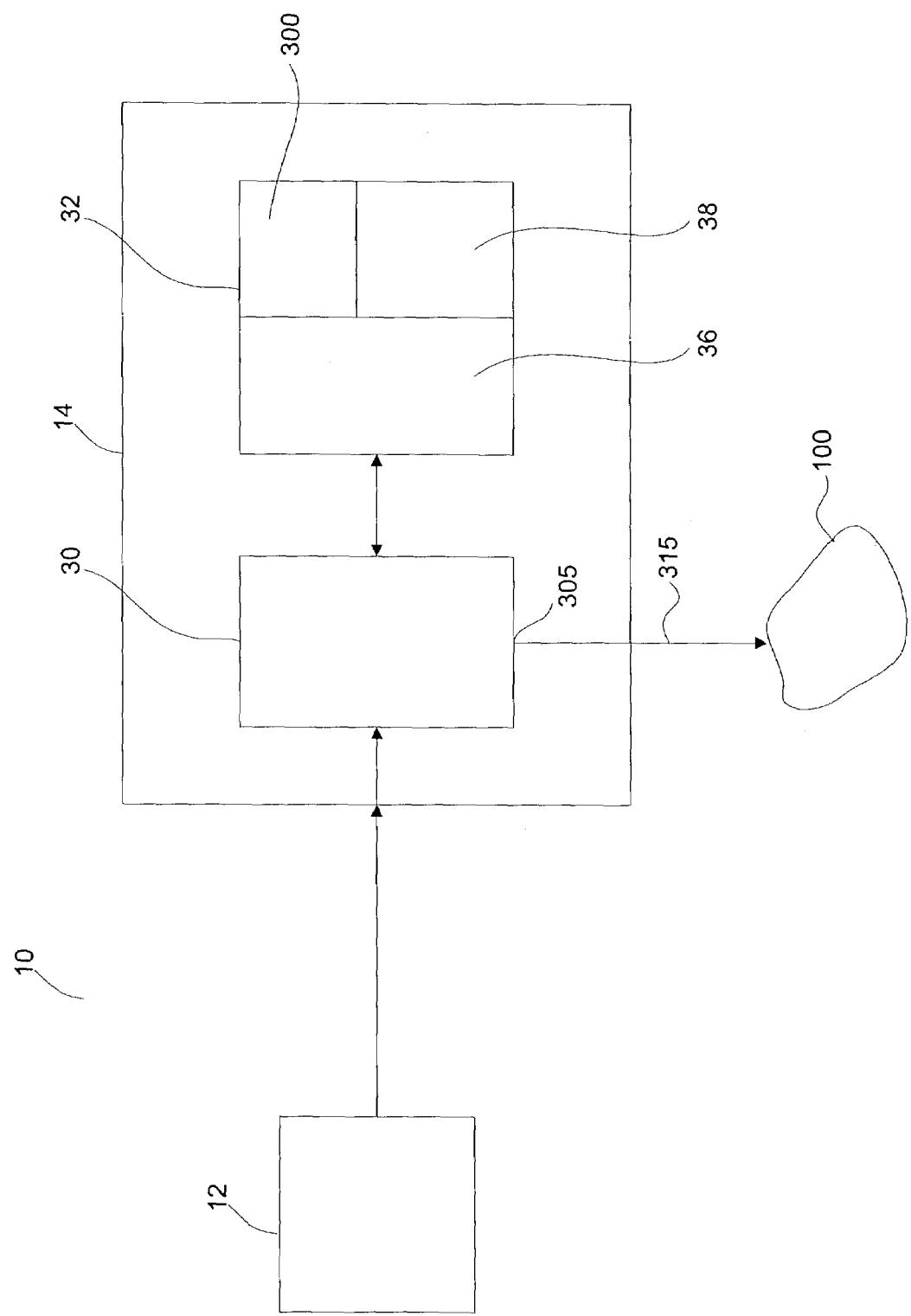
FIG. 3 shows a diagram of a computer used in one embodiment of the present invention.

Referring to FIG. 3, there is shown a computer (14) in one embodiment of the present invention attached to an imaging device (12) and forming a workstation (10). Computer (14) may be a notebook computer, desktop computer or a hand held device. Computer (14) includes a micro processor (30) and a memory (32) containing an operating system (36), imaging device driver (38) and image processor (300). Micro processor (30) is connected to the communications network (100) from output (305) by bus (315). The driver (38) is a software product that operates the imaging device to capture the image of the individual of interest. The image processor (300) is a software product capable to converting the video signal received from the imaging device and converting it to a biometric template. Products that can drive the imaging device and create the biometric template do the template matching are VSident™ for "one to many" searches and IT'S ME™ and VSRemote™ for "one to one" searches all by VisionSphere Technologies Inc.

Figure 4:
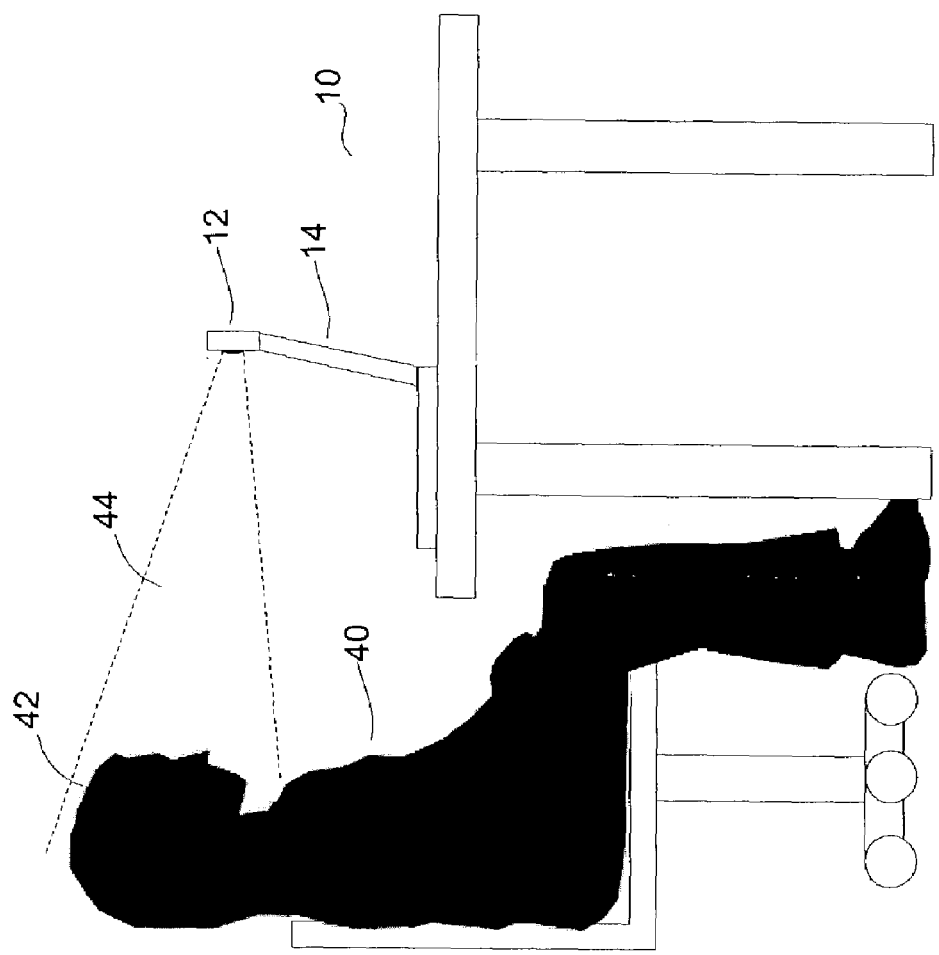
FIG. 4 shows an individual of interest before a workstation in one embodiment of the present invention.

To exemplify the operation of the present invention described up to this point, FIG. 4 shows the operation of the workstation in one embodiment of the present invention. Let us say, for example, that a local police department has detained an individual suspected of a crime, or alternatively, an individual who has been listed as missing. This individual is the individual of interest. The police officer wishes to confirm the identity of the individual of interest. The individual of interest (40) is seated (or otherwise placed) before the workstation (10) so that the individual's face (42) falls within the visual cone (44) of the imaging device (12). The user, in this example, a police officer, initiates the imaging device driver stored in the computer (14). The imaging device (12) will capture the image of the person of interest in a variety of positions as exemplified in FIG. 5. This is to increase the confidence that a subsequent search of a biometric database will yield identification of the individual of interest. Referring back to FIGS. 3 and 4, the image processor (300) will convert the video images of the individual of interest into digitized biometric templates unique to that individual. As further described herein, the image is then transmitted via communications network (100) to a server and then to the single or plurality of databases for comparison. Search results will be sent back to the police officer who can check the search results to find duplicate or multiple images of the individual that may be present in the search results in order to confirm the identity of the individual.

Figure 6:
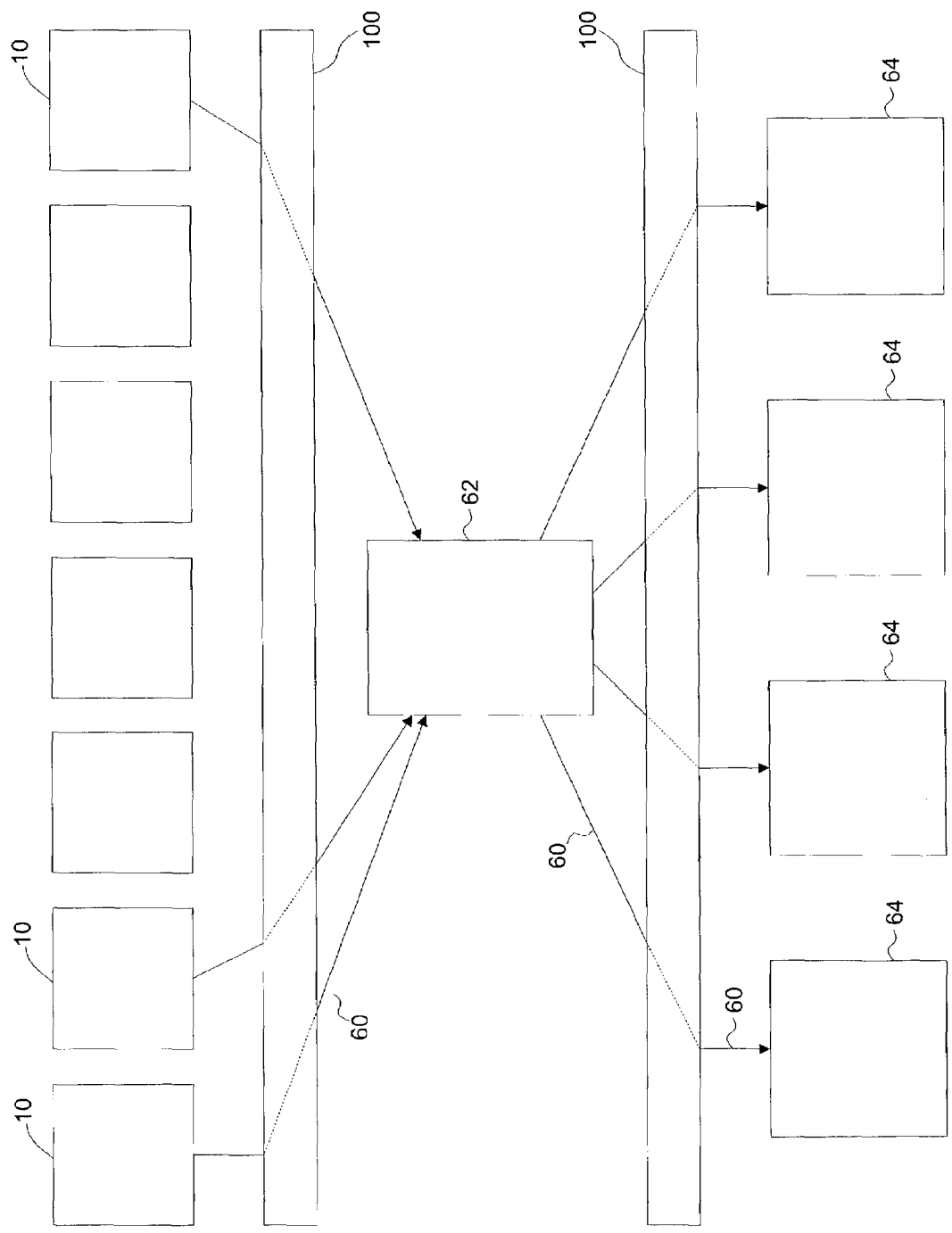
FIG. 6 shows a system for searching biometric databases in another embodiment of the present invention.

Referring to FIG. 6, a system for searching a biometric database is shown. As previously described, the system comprises at least one workstation (10). The workstation can be, for example, located in the police station of a small community. As well, the workstation could be located at border crossings. As previously described and referring to FIGS. 1 to 4 the workstation (10) comprises an imaging device (12) attached to a computer. Images are obtained and converted to biometric templates at the workstation. In operation, the user at the workstation (10) will desire to verify the identity of an individual of interest. The user will initiate a search inquiry (60) at the workstation (10). Image processing software (300) will transmit the biometric template created at the workstation (10) through a communications network (100) to a server (62). Server (62) is in turn connected to either a single database of biometric templates or, as shown in FIG. 6, a plurality of databases (64) of biometric templates. To carry the law enforcement example forward, each of the databases (64) may represent the biometric database of a large metropolitan police station such as New York City or Vancouver or police agency such as the FBI or RCMP containing tens or hundreds of thousands of biometric templates.

Figure 6A:
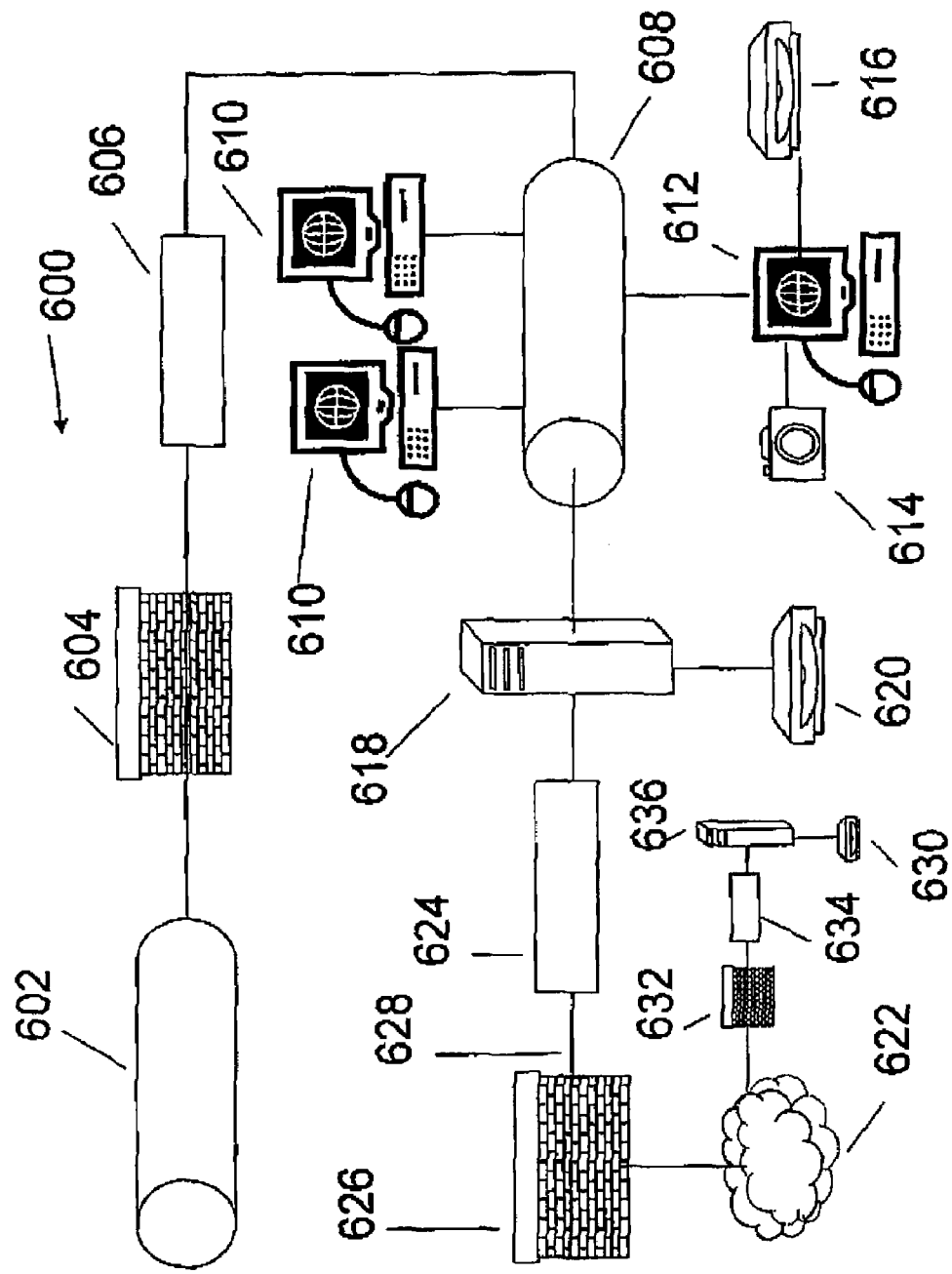
FIG. 6A shows a secure system for searching biometric databases.

Still referring to FIG. 6, once the server (62) receives the query (60) from a particular workstation (10) the server will transmit the request through communications network (100) to all of the databases (64) attached to the network. Referring to FIG. 6A. there is shown in greater detail the security aspects of the present invention. The system (600) may consist of a secure wide area network (602) in communication through firewall (604) and firewall router (606) with a secure local area network (608). Connected to the local area network are workstations (610) which are requesting nodes where search queries may be initiated. Also connected to the local area network is an enrollment workstation (612) having a biometric scanning device (614) such as a facial scanning device, or iris scanning device or voice scanning device. Scans of individuals may be taken, such as at local jails or passport offices, and added to the database (616) of know persons. A server (618) is connected to the local area network. The server has a database (620) referred to as a identification nodes containing biometric templates of face, iris or voice of known persons that may be searched by other requesting nodes not on the network. The server and database are isolated from the public network (622) by a router (624) in which all ports are closed except for the port being used by the server. In this way the server may not be hacked because it is always connected to firewall (626). The lines (628) between the firewall (626) and router (624) may be a dedicated DSL line with standard encryption. Any of the requesting nodes (610) may search distributed and remote identification nodes (630) through the public Internet (622) by sending a query through the Internet which will pass through the identification node fire wall (632), router (634) and server (636). The secure data is kept on a server within the local area network while the templates which are subject to a distributed search are kept outside the local area network. The local area network is protected by firewalls.

Figure 7:
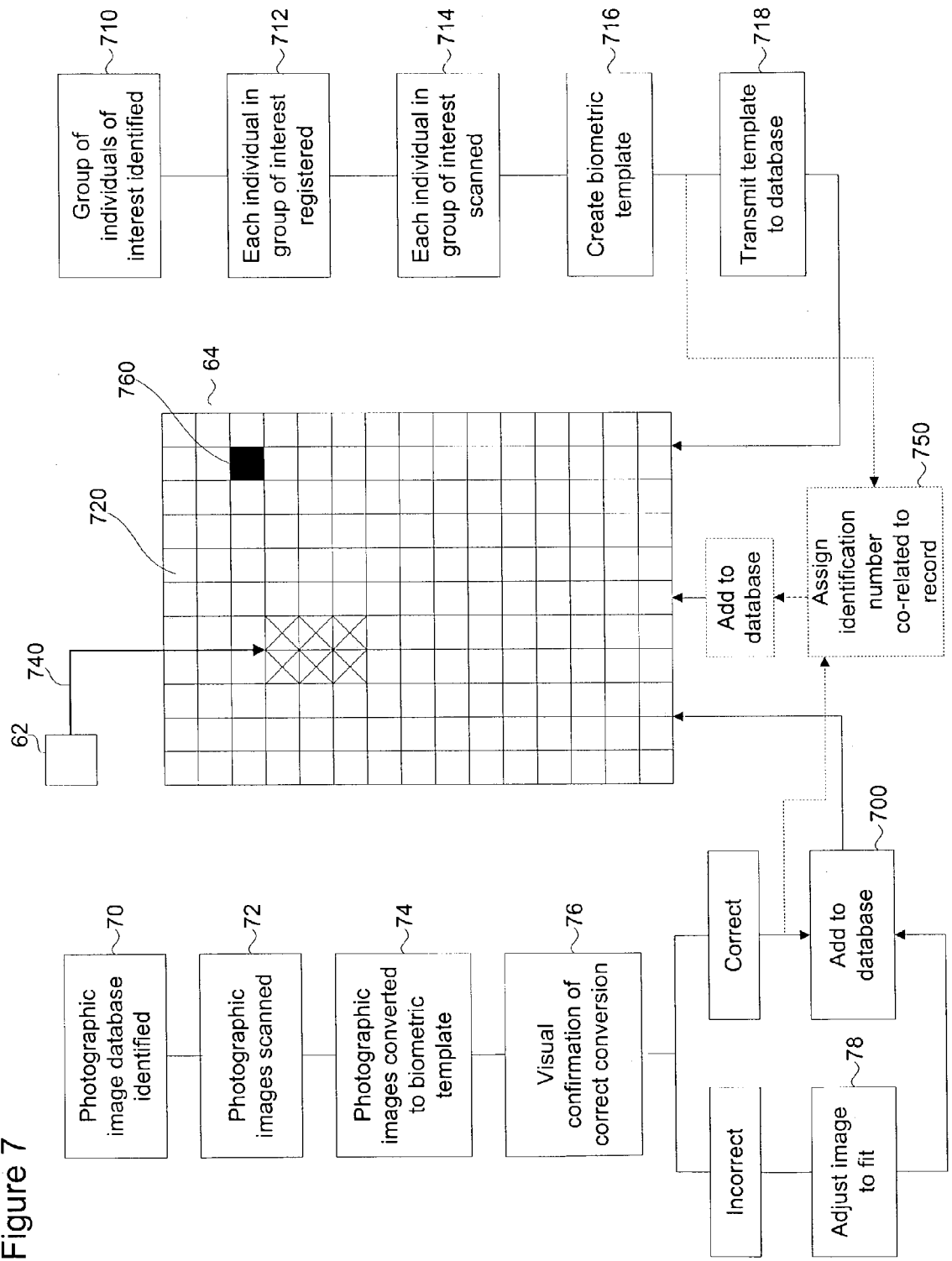
FIG. 7 shows a process for creating a biometric template database in another embodiment of the present invention.

Referring to FIG. 7, the database (64) may be created in a number of ways. In one aspect of the present invention, the database of biometric templates is created from a pre-existing database of images of a group of individuals (70). For example, a large metropolitan police station may have an image database of thousands of individuals. These images may be photographic images or they may be contained in a database of digitized images in a gif, tif, jpeg or similar image format. Each of these images is scanned by an image detector (72) and converted into a biometric template by processing software such as VSident™, IT'S ME™ and VSRemote™ (74) previously mentioned. Since the biometric templates are not derived from live individuals there is no way to capture a variety of head positions. The user will be able to visually confirm the correct scanning of the image using the software (76). In those cases where the head position in an imperfect image does not lend itself to biometric conversion, the user will be able to manually intervene and adjust the scanning process so that the image processing software can extract the required facial features from the imperfect image (78). The biometric templates are then placed (700) in the database (64).

Figure 5:
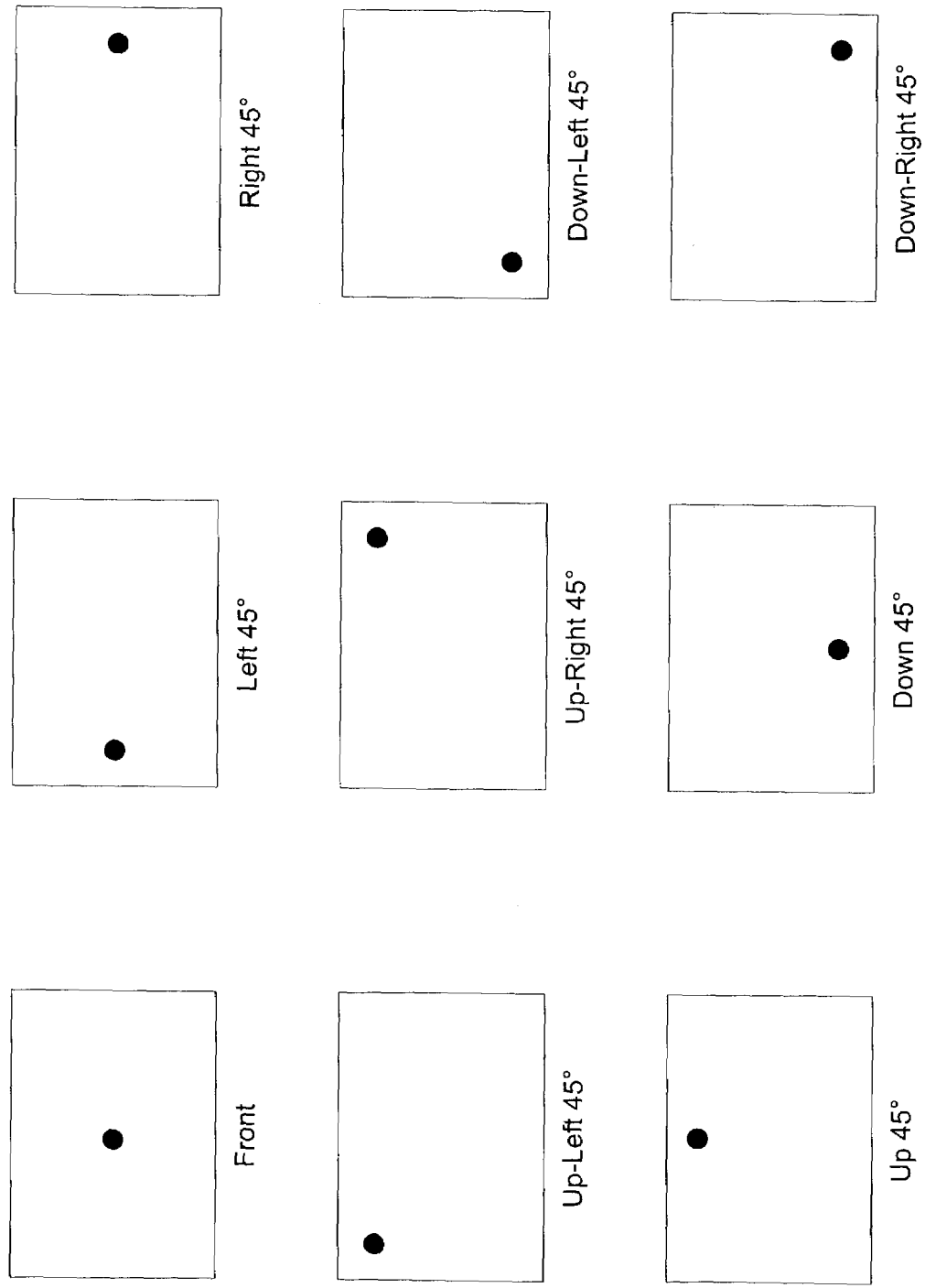
FIG. 5 illustrates a variety of facial poses necessary to create a biometric template in one embodiment of the present invention.

Still referring to FIG. 7, the database may be created using a registration process. This type of process is most applicable to situations where a group of individuals of interest all share a common entitlement such as diver's licenses. Once the group of interest is identified (710) each individual in the group of individuals of interest is registered by a registration process (712) wherein the identity of the individual is recorded textually and the face of the individual is scanned into the workstation (714). This is illustrated in FIGS. 4 and 5. The workstation will create a biometric template of the individual (716). Once the biometric template of the individual is created it is transmitted to a central database containing all of the biometric templates of the individuals in the defined group of interest (718). In this way each of the individuals who share the common entitlement will have their biometric templates stored on the central database. The database (64) will include a search engine (720) capable of receiving (740) a query from a server (62) through the network (100) including a target biometric template to be searched. The search engine (720) will search the database (64) and comparing the target biometric template to all of the biometric templates contained in the database to identify potential matches. Search engines include the VSident™, IT'S ME™ and VSRemote™ products by VisionSphere Technologies Inc. The search engine also has a buffer memory (760) where matched biometric templates are collected and temporarily stored prior to transmitting to the server as further described herein. As shown by the dotted line in FIG. 7, the present invention permits each biometric template to be specifically assigned a specific identification number (750). That number is correlated to a file containing additional records pertinent to the individual of interest. As further described below, once the matched biometric templates have been selected, the user has the option, from the workstation, of requesting the relevant file for one or a plurality of individuals.

Figure 8:
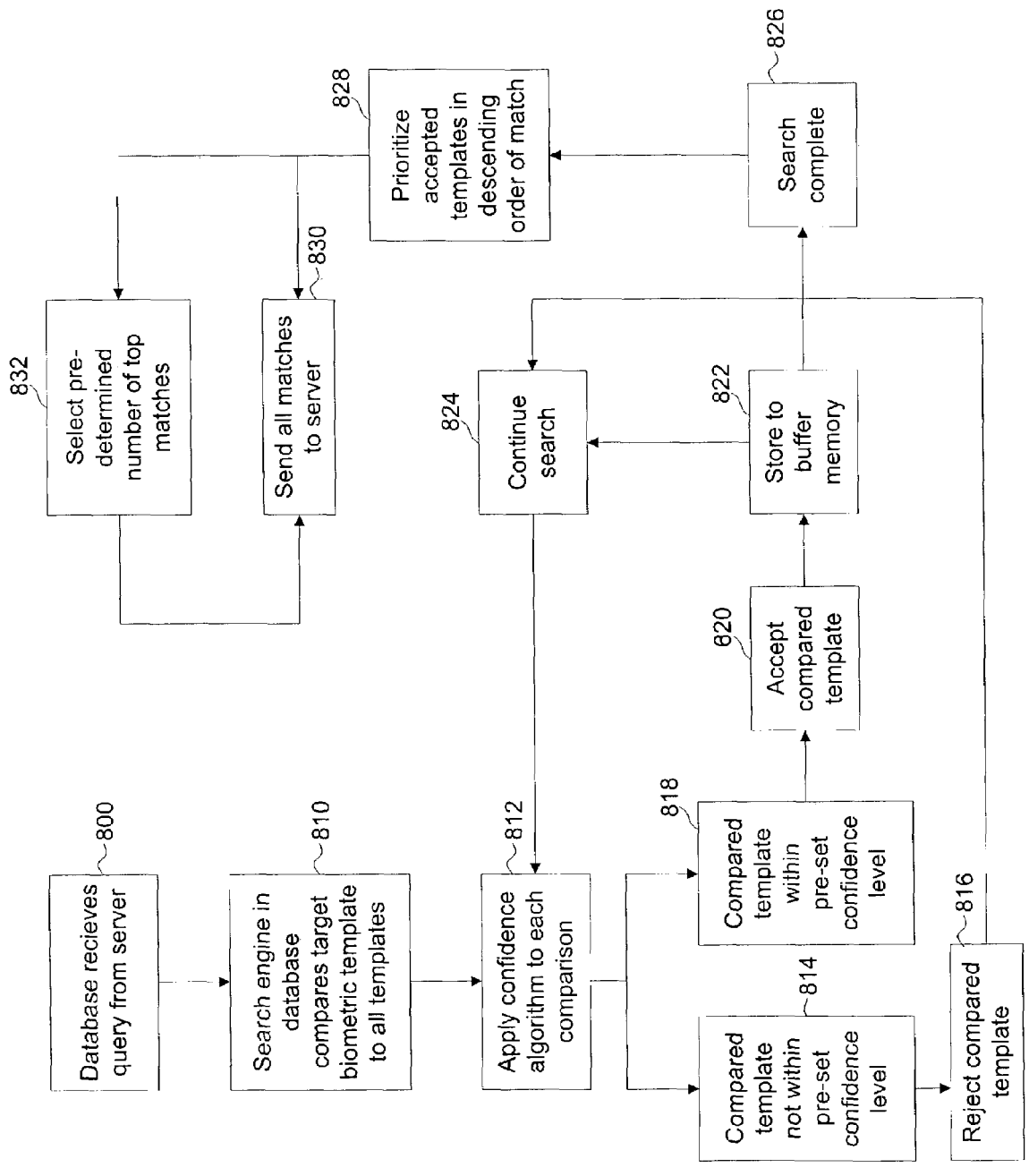
FIG. 8 shows a flow diagram for a process for searching a biometric template database in another embodiment of the present invention.

Referring to FIG. 8 there is shown a process whereby the search engine within the database identifies the closest potential matches to the target biometric template. The database to be searched will receive a search query from a workstation through the server (800). The query includes the target biometric template to be searched. The search engine will compare each of the biometric templates in the database to the target biometric template (810). When comparing the target biometric template with each of the biometric templates stored in the database the search engine applies a predetermined (812) match similarity measure. For example, the search engine may be set to identify biometric templates that match the target biometric template to a 95% similarity (814). Therefore the search engine establishes a match level below which biometric templates will be rejected as potential matches (816). If the compared biometric template falls within the pre-set similarity level (818) that template is accepted (820) and a copy is stored (822) in buffer memory (FIG. 7-760). The search continues (824) until all of the biometric templates in the database are compared to the target biometric template. Once the search is complete (826) all templates stored in the buffer memory are prioritized in descending order according to their closeness of match to the target template (828). The search engine will then transmit the prioritized closest matches contained in the buffer memory to the server (830). However, a search may yield hundreds of possible matches that fall within the pre-set confidence level. Therefore, the search engine may be set to identify a pre-set number of possible matches (832), for example, the top 20 matches, and forward those to the server.

Figure 9:
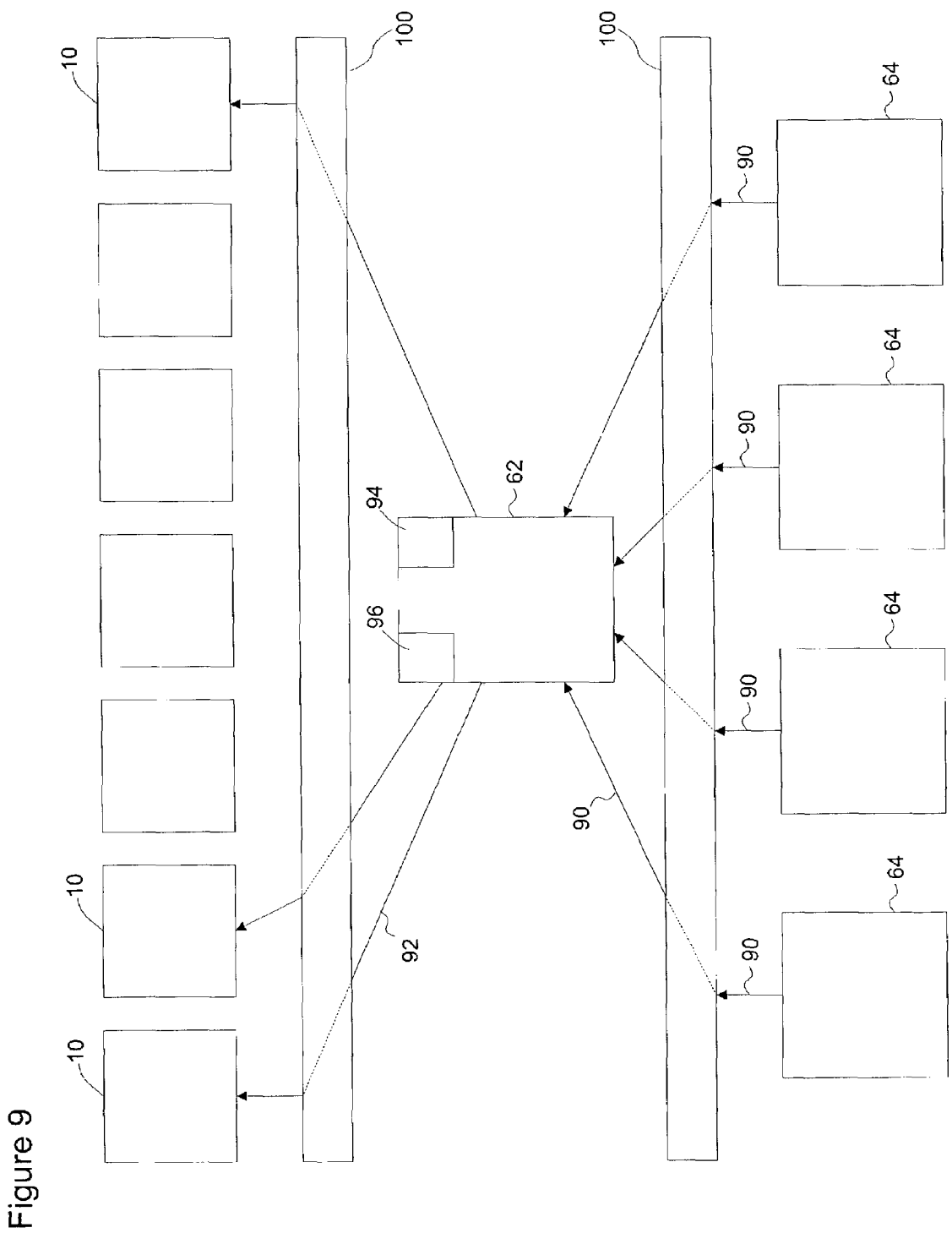
FIG. 9 shows a system for searching a biometric template database in yet another embodiment of the present invention.

Referring to FIG. 9, the server (62) will receive (90) potentially matching biometric templates from a single central database or a plurality of databases (64). Understandably, if there is a plurality of databases connected to the network then the server could receive hundreds of potentially matching biometric templates. Sending (92) such a large number of potentially matching biometric templates to the workstation (10) would be impractical for the user. Therefore, server (62) also contains a search engine (94) that establishes a desired similarity level and a memory (96) for temporarily storing the biometric templates received from the databases. The search engine may be like the VSident™, IT'S ME™ and VSRemote™ products noted above.

Figure 10:
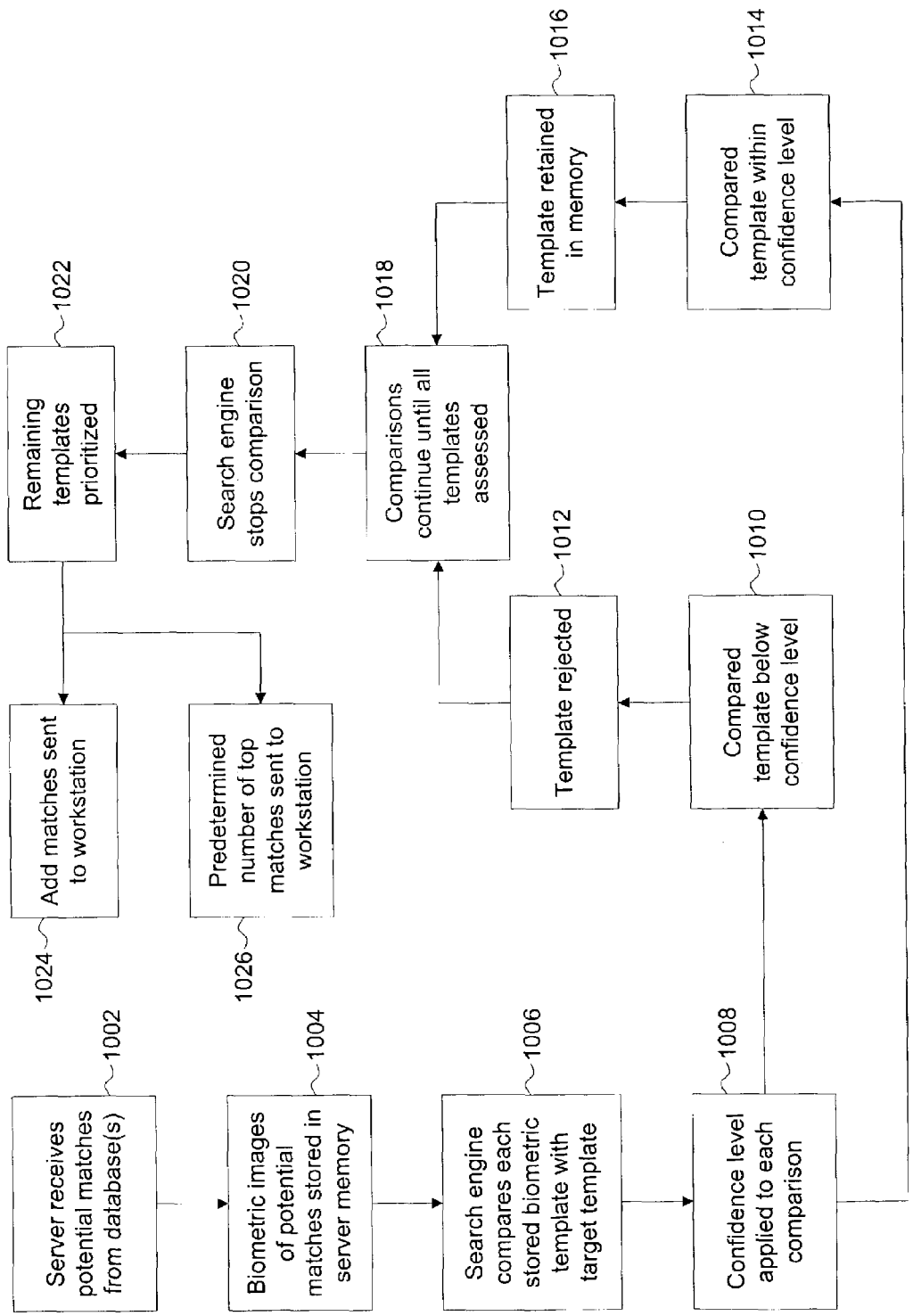
FIG. 10 shows a flow diagram for a process for searching a biometric template database in another embodiment of the present invention.

Referring to FIG. 10 there is shown a process by which the server (62) will further manipulate the search results. The server will receive the closest matched biometric templates from one or a plurality of databases (1002). The matched templates are stored in the server memory (1004). The search engine having a predetermined similarity measure will review each biometric template stored in the server against the target biometric template. A pre-selected similarity level, for, example 97%, will be,applied to all of the stored templates (1008). Those biometric templates that fall beneath the similarity level (1010) will be rejected (1012). Those templates that fall on or above the level (1014) will be retained in the memory (1016). The search engine will execute comparisons and apply similarity levels until all templates stored in the server have been assessed (1018). At that time the search engine will cease comparing templates (1020). Once the comparisons have been completed the search engine will prioritize the remaining templates according to the nearest similarity of templates (1022). These matches will then be sent to the workstation (1024). Alternatively, the search engine may be programmed by the user to select a predetermined number of top matches and send those to the workstation (1026).

Figure 11:
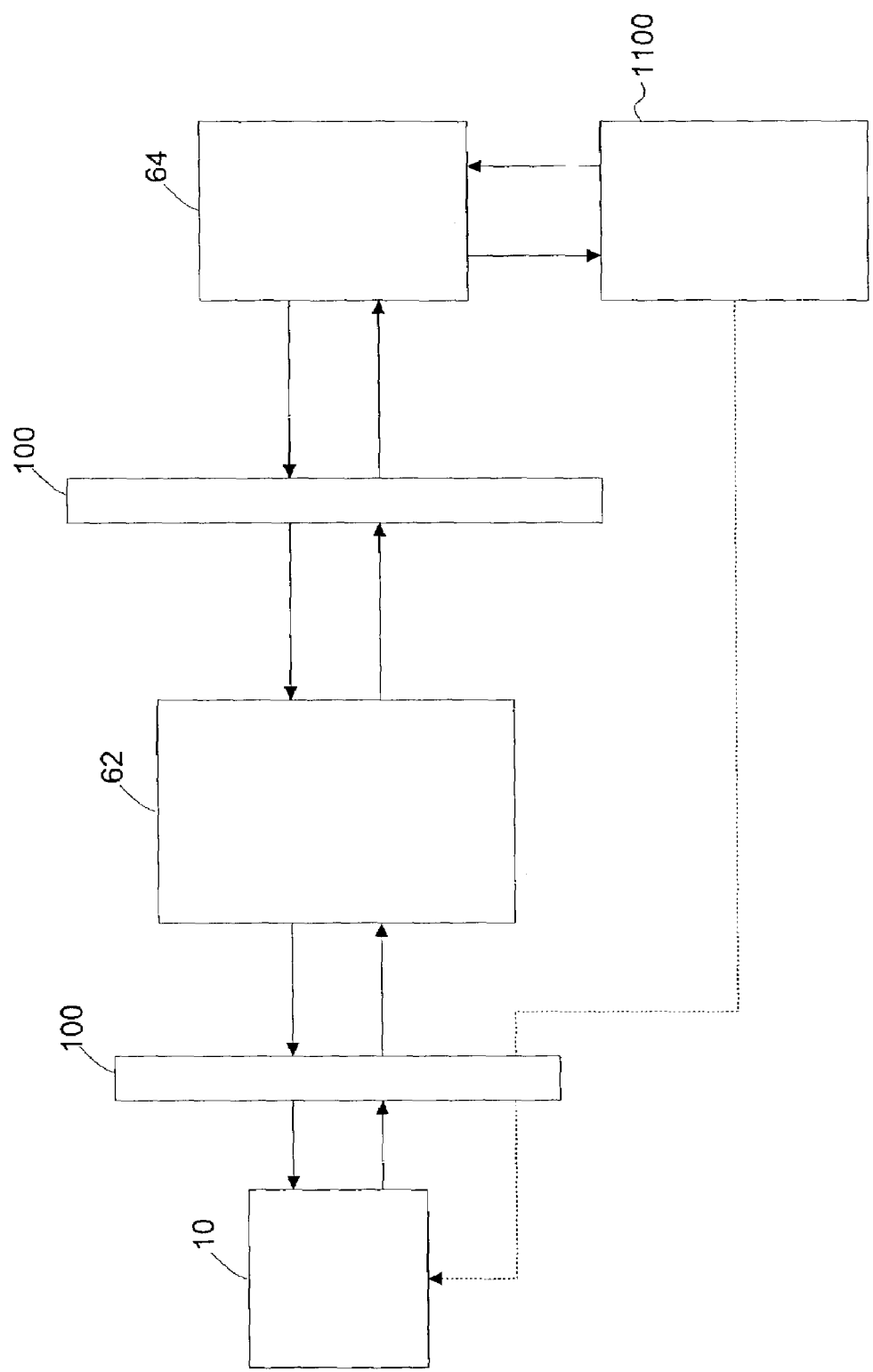
FIG. 11 shows a system for retrieving additional data in one embodiment of the present invention.

Referring to FIG. 11 there is shown another aspect of the present invention in which textual information pertaining to an individual of interest may be transmitted from a database to the workstation. For simplicity, a single workstation (10) is shown. Once the biometric templates of the persons most closely matching the identity of the person of interest is sent to the workstation (10) from the server (62) through communications network (100), the user will have the option of requesting the full record of any particular individual of interest. The biometric templates received by the workstation will be converted into images by the image processor on the workstation. Each image will be tagged with a unique digital identifier that correlates the image to that individual's record. The records may be contained on a separate database (1100) as they are mostly textual in nature. The user will instruct the workstation (10) to obtain a particular record. The workstation will submit the unique digital identifier for that image to the server and subsequently the server will transmit the request to the database (64). Database (64) will forward the request to database (1100) where all of the records are stored. Once database (1100) identifies and retrieves the record files for that individual it will transmit them to the database (64) that will subsequently transmit them through server (62) to the workstation. At the workstation, the files may be stored and downloaded. Alternatively, database (1100) may transmit the records directly to the workstation as shown by the dotted line in FIG. 11.

Figure 12:
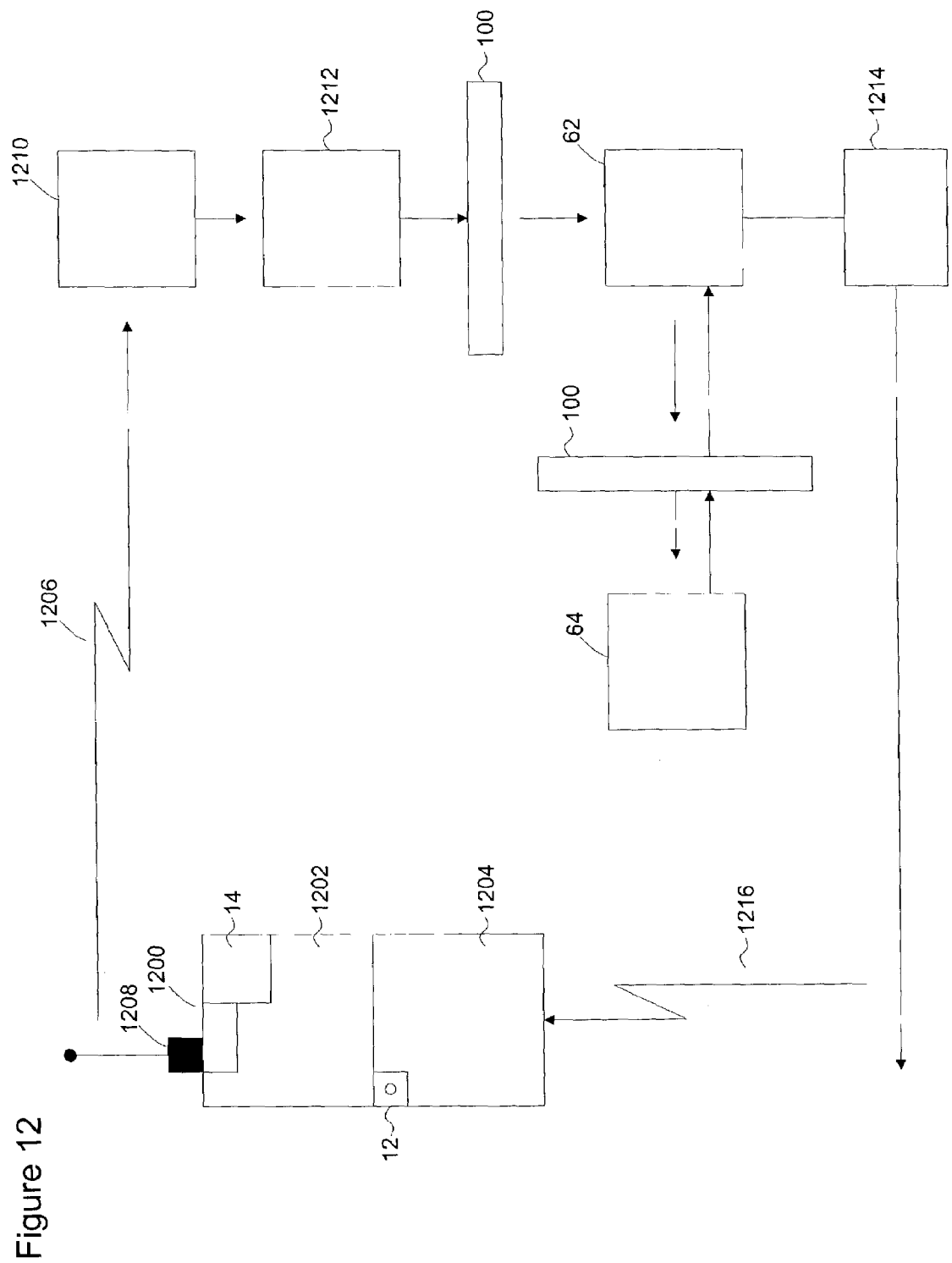
FIG. 12 shows one embodiment of the present invention applied to a mobile platform.

Referring to FIG. 12 there is shown another aspect of the present invention wherein the workstation is located on a mobile platform such as a police car. The police car is represented by block (1200) having a front driver's portion (1202) and a rear passenger portion (1204). Image detector (12) is located in the passenger portion so that it is capable of capturing the facial image of an individual of interest contained in the passenger compartment. The workstation computer (14) is located in the front driver's portion and is operable by the police officer. The workstation computer is connected by way of a wireless connection (1206) to a local receiver (1210) that is within range of the police car radio transmitter (1208). In operation, an individual of interest is placed in the back seat of the police car. The police officer submits a query through the computer (14). The image detector captures the facial image of the individual. The image is converted into a biometric template and then transmitted by the police's car radio to a local receiver within range. The receiver then transmits the signal to a portal (1212) to the communications network (100). The query is then transmitted to the server for transmission to one or more databases (64). The search engine on the database will execute a search as previously described and identify possible matches. The matches will be sent back through the server to a workstation at the local police department (1214) where a positive visual identification will be made. The confirmation of identification will then be relayed (1216) to the police officer in the police car. The present invention contemplates improvements in broadband technology making it possible for the matches to be sent directly to the mobile platform for identification by the police officer.

Numerous modifications, variations, and adaptations may be made to the particular embodiments of the invention described above without departing from the scope of the invention that is defined in the claims.

What is claimed is:

1. A secure system for the verification of the identification of a person of potential interest as a person of real interest using remote searching of facial, iris and voice biometric templates, said secure system comprising:
   a. security means for securing the secure system;
   b. a plurality of computer workstations distributed on a computer network wherein at least one of said plurality of computer workstations is a requesting node seeking verification of the person of potential interest;
   c. a biometric template of the person of potential interest obtained at said requesting node wherein said biometric template is a search target and wherein said search target is derived from one of a facial scan, an iris scan or a voice print scan;
   d. a verification query comprising the search target and a set of normalized search conditions comprising at least a first predetermined search speed and a first predetermined similarity measure, wherein said first predetermined similarity measure determines the degree of similarity between the search target and a plurality of biometric templates of said persons of real interest to constitute a match;
   e. a plurality of identification nodes comprising a plurality of shared, remotely distributed and searchable databases comprising said plurality of biometric templates of the persons of real interest, wherein each template of said plurality of biometric templates of the persons of real interest is tagged with art unique digital identifier that correlates said each biometric template of said plurality of biometric templates with a digitized textual record, wherein said digitized textual record is included in a remote database of digitized textual records accessible by the requesting node, and wherein said plurality of identification nodes is in secure communication with said computer network;
   f. a server having a server memory, said server in secure communication with the computer network for addressing said verification query to said at least one of the identification nodes; and,
   wherein each of the a least one of the identification nodes includes a node memory and is adapted to:
      i. receive the verification query from the requesting node;
      ii. execute the verification query by comparing the search target with the biometric templates of persons of real interest stored on the at least one of the identification nodes;
      iii. select a first group of matching biometric templates of persons of real interest falling within the first predetermined similarity measure;
      iv. store said first group of matching biometric templates in said node memory;
      v. prioritize the matching biometric templates of the first group in descending order of closest match;
      vi. select a first predetermined number of top matching biometric templates; and,
      vii. transmit said first predetermined number of top matching biometric templates to the server.

2. The system of claim 1 wherein the server is adapted to:
   a. receive the first predetermined number of top matching biometric templates;
   b. store the first predetermined number of top matching biometric templates in said server memory;
   c. re-execute the verification query by comparing the search target with the first predetermined number of top matching biometric templates stored in the server memory;
   d. select a second group of matching biometric templates of persons of real interest falling within a second predetermined similarity measure, wherein said second predetermined similarity measure is higher than the first predetermined similarity measure;
   e. discard biometric templates that fall outside of the second predetermined similarity measure;
   f. store the second group in the server memory;
   g. prioritize the second group in order of closest match;
   h. select a second predetermined number of top matching biometric templates from within the second group; and,
   i. transmit said second predetermined number to the requesting node.

3. The system as claimed in claim 2 wherein the second predetermined number are stored at the requesting node for visual verification of the identity of the target.

4. The system as claimed in claim 3 wherein said plurality of remotely distributed and searchable shared databases comprising said plurality of biometric templates of the persons of real interest comprise biometric templates derived from video images of live persons of real interest and biometric templates derived from pro-existing still photographs of persons of real interest.

5. The system as claimed in claim 4 wherein the requesting node is able to securely access the plurality of identification nodes to add new biometric templates thereto.

6. The system as claimed in claim 5 wherein the biometric template is a facial biometric template derived from a set of facial images includes the following facial images: full front, 45 degree left turn, 45 degree right turn, 45 degree tilt up, 45 degree tilt down, 45 degree tilt up right and 45 degree tilt up left.

7. The system as claimed in claim 6 wherein said security means comprises encryption means between the requesting node and the identification node.

8. The system as claimed in claim 7 wherein said security means comprises the creation of a virtual private network between the requesting node and the identification node.

9. The system as claimed in claim 8 wherein said security means comprises the use of authentication codes, whereby the verification query is submitted to the plurality of identification nodes with an authentication code which the plurality of identification nodes will match prior to accepting the verification query.

* * * * *